Feb. 11, 1930.  C. P. ROSS  1,746,743
MATERIAL HANDLING PLANT
Filed Nov. 2, 1925  3 Sheets-Sheet 1
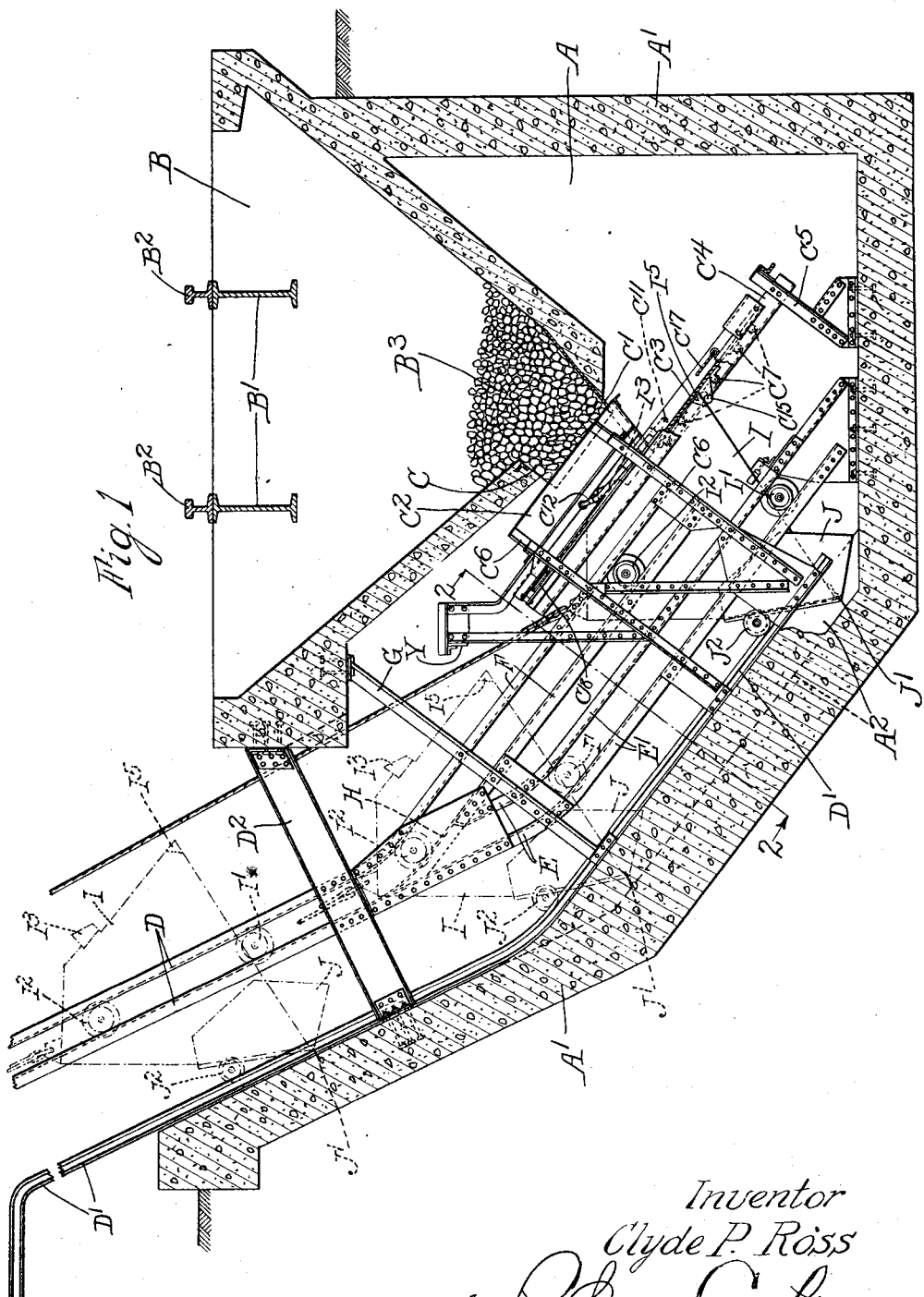
Inventor
Clyde P. Ross
by Parker & Carlton
Attorneys.

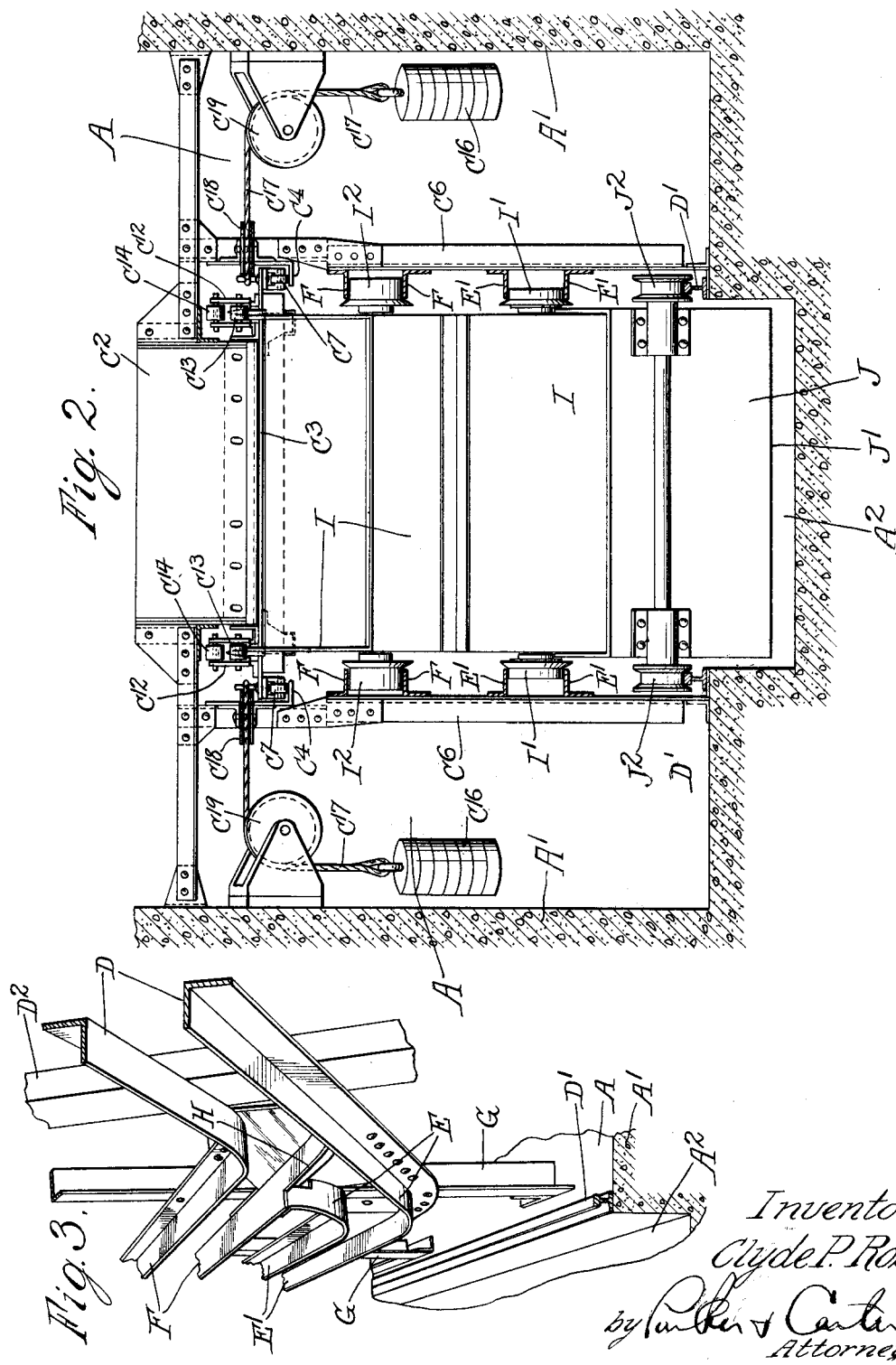

Feb. 11, 1930.                C. P. ROSS                1,746,743
                        MATERIAL HANDLING PLANT
                        Filed Nov. 2, 1925        3 Sheets-Sheet 3
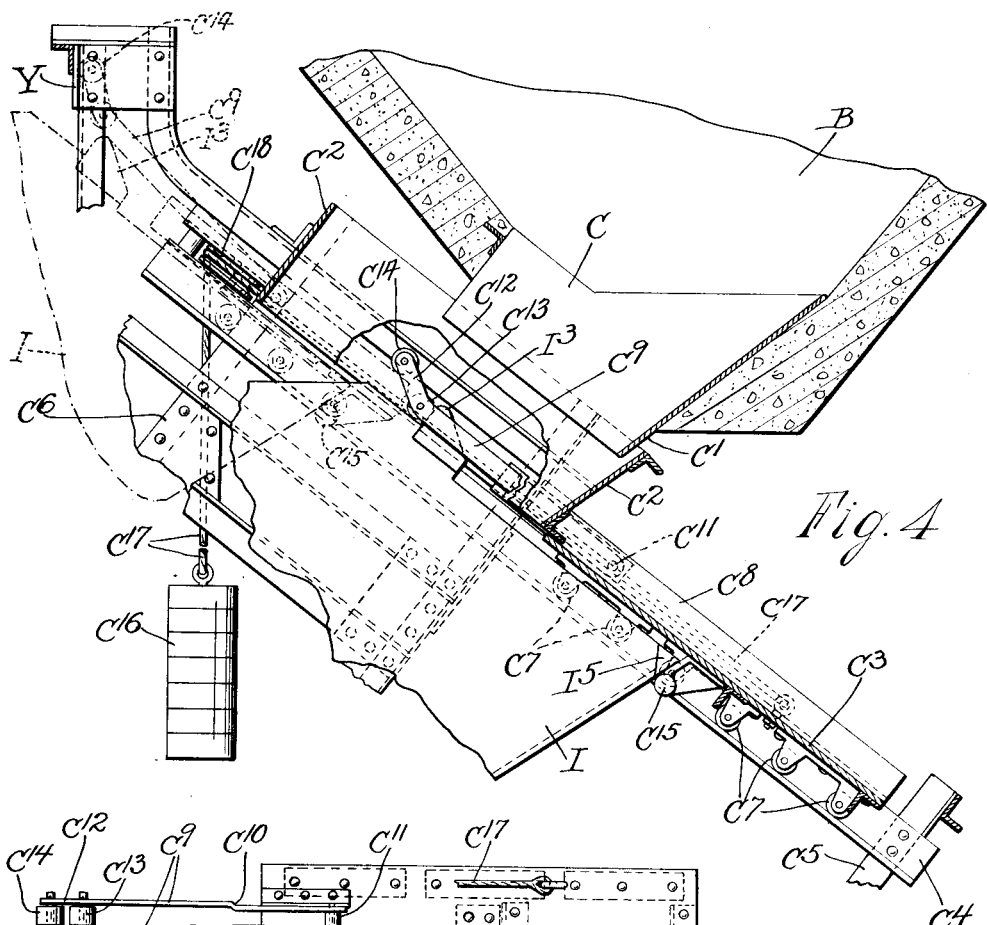
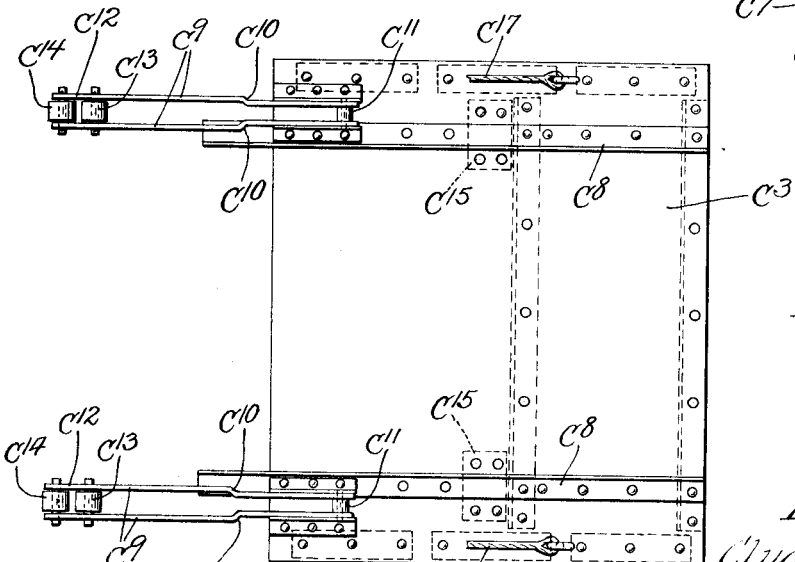
Inventor.
Clyde P. Ross
by Parker + Carter
Attorneys.

Patented Feb. 11, 1930

1,746,743

UNITED STATES PATENT OFFICE

CLYDE P. ROSS, OF CHICAGO, ILLINOIS

MATERIAL-HANDLING PLANT

Application filed November 2, 1925. Serial No. 66,413.

This invention relates to a material handling plant and in the form here illustrated is embodied in connection with a plant for handling granular material such as coal and the like. It has for one object to provide in connection with such a plant a simplified structure whereby a bucket or similar movable receptacle may be raised and lowered beneath a bin to be filled therefrom, and whereby it may be moved laterally beneath the bin without undue additional complications. Another object is to provide means whereby the wheels which support the bucket during the major portion of its travel also support and guide it when it commences to move laterally under the bin and during such movement. Other objects will appear from time to time throughout the specification and claims.

My invention is illustrated more or less diagrammatically in the accompanying drawings, wherein:

Figure 1 is a vertical cross section showing the bin, the bucket and a portion of the track;

Figure 2 is a transverse cross section taken on line 2—2 of Figure 1;

Figure 3 is a perspective of a portion of the guiding track.

Figure 4 is an enlarged cross section with parts in elevation showing in detail the discharge orifice from the bin and the gate mechanism.

Figure 5 is a top elevation of the gate.

Like parts are indicated by like characters throughout.

A is a loading pit. It is surrounded and enclosed by a structure of walls $A^1$. It is as shown irregular in shape and is adapted to receive a supporting mechanism for the bucket. It is provided with inclined walls, and in one of them is formed a trough or additional depression $A^2$.

B is a receiving bin formed so as to extend partially into the pit A. It is provided with walls which may be integral with the walls $A^1$ although this feature is not essential.

Extending across it are supporting members $B^1$. These may be of any suitable design. In the form here shown they carry rails $B^2$. Upon these rails a car or other receptacle may be run, and it may be dumped into the bin. The contents of the bin is diagrammatically indicated at $B^3$.

At the bottom of the bin is a door C. It is provided with a short chute $C^1$ communicating with a long chute $C^2$, and for the door there is provided a movable closure or gate $C^3$. It is supported on rollers $C^7$ in a track work $C^4$ carried by a frame member $C^5$ and other frame members $C^6$. The gate is mounted so that it may be moved back and forth by the bucket so that as the bucket descends it moves the gate aside to open the door and permits discharge of material from the bin into the bucket. The details of this construction form no particular part of the present invention.

The gate member $C^3$ has on its top a pair of angles $C^8$. Pivoted adjacent these angles is a pair of door engaging latches $C^9$. Each of them is formed as shown of two side members bent inwardly as at $C^{10}$ and pivotally mounted as at $C^{11}$ on the gate. Each of them is provided with an upwardly bent portion $C^{12}$ and at the commencement of each of such portions it has a roller $C^{13}$. At its upper end each has a roller $C^{14}$. Across its bottom the gate is provided with bucket contacting members or stop brackets $C^{15}$ and an angle which extends generally across the bucket and are contacted by the upper point $I^5$ of the bucket I as it descends into the pit and beneath the bin. The gate is normally held closed by one or more counterweights $C^{16}$ each of which is attached to a cable $C^{17}$ and at its other end is fastened to the gate and passes over a sheave $C^{18}$, $C^{19}$.

D is a double track. In the form here shown it is made up of two angle track members. Two of such double tracks are provided, one on each side of the structure. Beneath each of such double tracks a single track or rail $D^1$ is provided. This latter runs throughout substantially the height of the structure and extends into the bin almost to its bottom. Within the upper portion of the pit A the double track structure D is supported on a frame work $D^2$. A little below this point the double track D branches and is split into two portions. One of these portions E is in effect a continuation of the track D. It continues in the same direction and it then turns laterally as shown at $E^1$ and extends under the bin B.

F is a second double track which turns from the track D at a point immediately below the frame member $D^2$ and extends under the bin B and throughout the major portion of its length it is parallel to the portion $E^1$ of the track E. The tracks E, $E^1$ and F are supported on frame members G and adjacent their lower ends on frame members $C^6$ which also serve to carry the gate structure above mentioned.

As shown particularly in Figure 3 the track D at the point where the track E branches off from it is cut away so that at this point a roller or wheel which does not extend clear across it so as to contact its outer edge will pass through the cut-away portion H and thus come upon the track E. A wide roller which extends clear across the face of the member D will not fall through the cut-away portion H but will be directed onto the track member F. Thus means is provided for switching one set of wheels on the upper track.

I is a bucket provided on either side with flanged wheels or rollers $I^1$ and provided also on either side with another flanged roller $I^2$. Such rollers are wider than the rollers $I^1$. The bucket I has an open top. A gate opening contact member $I^5$ is mounted on its top and it is this member which strikes the gate $C^3$ as the bucket descends into the pit and moves underneath the bin.

The bottom of the bucket is provided with an opening which is normally closed by means of the hooked member J. This member is hinged to the bucket adjacent the point $J^1$. It is provided on its bottom with a pair of double flanged rollers $J^2$. These rollers run upon the rails $D^1$.

Although I have shown an operative device, still it will be obvious that many changes might be made in size, shape and arrangement of parts without departing materially from the spirit of my invention; and I wish, therefore, that my showing be taken as in a sense diagrammatic.

The use and operation of my invention are as follows:

This apparatus is normally part of a coal or other material handling plant in which the material to be handled is transported in cars and from them dumped into a receiving bin. From this bin material is discharged periodically into a bucket which is periodically raised and lowered. The load of the bucket is itself, after having been raised, discharged into some other receptacle.

When the apparatus is to be used therefore the material is discharged into the receiving bin. The bucket is then lowered beneath the bin and as it moves to its position it automatically opens the gate controlling the discharge of material from the bin and the bucket is filled. Thereupon the bucket is raised along tracks and as it is moved away from the discharge opening of the bin the gate is allowed to return and so is closed. Further discharge of material is prevented and the bucket moves upward to the discharge position where it is in a similar manner discharged. In the form herewith shown when the bucket has reached the upper position the track $D^1$ bends away from the track D and the closure J is sprung open for discharge of material.

Since there are but two rollers on each side of the bucket, these rollers serve at once to carry the weight of the bucket and to guide and prevent its tilting. By the arrangement of tracks shown and by the use of the wider and narrower roller on each side of the car, the same track which carries the bucket for the major part of its movement is in effect continued downward into the pit beneath the bin. One pair of rollers remains in this track constantly, that is to say the lower pair or the narrower pair. The upper pair of rollers, however, is switched or diverted from this track as the bucket commences its movement under the bin, and thus the angle of inclination of the bucket with respect to the track is changed, but its angle of inclination with respect to the horizontal remains fixed. This is accomplished by the use of two tracks and two rollers on each side of the bucket.

I shall now describe the operation of the bin gate in cooperation with the movement of the bucket. As the bucket descends it first contacts the bracket $C^{15}$ on the bottom of the gate; as it descends further, of course, it moves the gate downward. However, preferably before it contacts the bracket $C^{15}$ the portion $C^{12}$ of the member $C^9$ has been contacted by the contact member $I^3$ on the bucket. The member $C^9$ being pivoted rides up over this member and then drops down. Thus the gate is effectively locked to the bucket and the two move together.

When the bucket starts upward, the gate moves with it. The counterweights would tend normally to move the gate, but since the gate is locked to the bucket by reason of the engagement of the member $C^9$ with the members $I^3$, the gate is positively carried upward by the movement of the gate and this continues until the rollers $C^{14}$ contact the frame members Y in the pit. They then cannot move along with the bucket and are therefore raised upward along the frame Y about their pivot points and so free the contact parts $I^3$ of the bucket and the bucket thus moves upward independently of the gate, the gate remaining in the closed position and being held there by the counterweights. Thus the gate is positively opened by the movement of the bucket and positively drawn closed by the same movement.

I claim:

1. In a coal handling plant, a pit, a bucket adapted to move into such pit, a track carrying said bucket, said track extending within the pit and bent laterally, and a guide track within such pit only, there being two wheels on each side of said bucket of different thickness, the narrower wheel adapted to run on said main track and the wider wheels adapted to be diverted from such main track to the guide track.

2. In a coal handling plant, a bin, and a pit beneath such bin, a bucket adapted to move into such pit and beneath such bin, a track carrying said bucket, said track extending within the pit and bent laterally beneath the bin, and a guide track joining and extending partially into said main track and lying generally parallel to its bent portion, there being two wheels on each side of said bucket of different thickness, the narrower wheel adapted to run on said main track and the wider wheels adapted to be diverted from such main track to the guide track, whereby the bucket moves into the pit and beneath the bin without tilting with relation to the horizontal.

Signed at Chicago, county of Cook and State of Illinois, this 28th day of October, 1925.

CLYDE P. ROSS.